US012802588B2

(12) United States Patent
Creed

(10) Patent No.: US 12,802,588 B2
(45) Date of Patent: Nov. 17, 2026

(54) MUSEUM ACCESS FOR ALL SYSTEM AND METHOD

(71) Applicant: Carrie Amanda Creed, Louisville, KY (US)

(72) Inventor: Carrie Amanda Creed, Louisville, KY (US)

( * ) Notice: Subject to any disclaimer, the term of this patent is extended or adjusted under 35 U.S.C. 154(b) by 332 days.

(21) Appl. No.: 17/874,465

(22) Filed: Jul. 27, 2022

(65) Prior Publication Data

US 2024/0038095 A1 Feb. 1, 2024

(51) Int. Cl.
*G09B 21/04* (2006.01)
*G06F 40/58* (2020.01)
*H04W 4/02* (2018.01)
*H04W 4/024* (2018.01)

(52) U.S. Cl.
CPC ............. *G09B 21/04* (2013.01); *G06F 40/58* (2020.01); *H04W 4/023* (2013.01); *H04W 4/024* (2018.02)

(58) Field of Classification Search
CPC ........ G09B 21/04; G06F 40/58; H04W 4/023; H04W 4/024
See application file for complete search history.

(56) References Cited

U.S. PATENT DOCUMENTS

| | | | | |
|---|---|---|---|---|
| 5,461,371 | A | 10/1995 | Matsumoto et al. | |
| 8,090,459 | B2 | 1/2012 | Hsu | |
| 2002/0046259 | A1* | 4/2002 | Glorikian ............ | H04L 61/5084 707/E17.11 |
| 2002/0068991 | A1* | 6/2002 | Fitzsimmons, Jr. . | H04N 21/478 348/E7.071 |
| 2002/0143657 | A1 | 10/2002 | Yamaguchi et al. | |
| 2003/0155413 | A1* | 8/2003 | Kovesdi ................ | G06F 16/954 235/375 |
| 2006/0168300 | A1 | 7/2006 | An et al. | |
| 2009/0036147 | A1* | 2/2009 | Romano ................. | H04W 4/02 455/456.3 |
| 2011/0301835 | A1* | 12/2011 | Bongiorno ........... | G06Q 10/025 705/5 |
| 2011/0307599 | A1 | 12/2011 | Saretto et al. | |
| 2013/0080578 | A1* | 3/2013 | Murad ............... | G06Q 30/0241 709/217 |
| 2015/0067187 | A1* | 3/2015 | Glasser .................. | H04L 65/60 709/231 |

(Continued)

FOREIGN PATENT DOCUMENTS

| | | |
|---|---|---|
| CN | 102163397 A | 8/2011 |
| CN | 202084269 U | 12/2011 |

(Continued)

*Primary Examiner* — Richemond Dorvil
*Assistant Examiner* — Zeeshan Mahmood Shaikh
(74) *Attorney, Agent, or Firm* — H. Jay Spiegel

(57) ABSTRACT

A method facilitates communication of program information to visitors to museums and other facilities that include displays for educational interest. The method operates with a system including an APP downloadable onto a smartphone or other module, a facility system located within the museum or other facility and ability to communicate between the facility system and the smartphone or other module. The method facilitates communication with visitors needing any one or more of visual assistance, hearing assistance, and/or sensory assistance. The system includes a protocol translator which facilitates operation of the inventive method.

13 Claims, 7 Drawing Sheets

App Software Flowchart for Hearing Assistance and Translations

(56) References Cited

U.S. PATENT DOCUMENTS

| | | | | |
|---|---|---|---|---|
| 2018/0206069 | A1* | 7/2018 | Santos | H04W 4/026 |
| 2020/0314592 | A1* | 10/2020 | Dunn, Jr. | H04W 4/026 |
| 2021/0228130 | A1* | 7/2021 | Gossens | A61B 5/168 |
| 2021/0294837 | A1* | 9/2021 | Ensing | G06V 20/625 |
| 2024/0196062 | A1* | 6/2024 | Kozuka | G09G 5/377 |

FOREIGN PATENT DOCUMENTS

| | | | |
|---|---|---|---|
| CN | 102568357 | A | 7/2012 |
| CN | 105574564 | A | 5/2016 |
| CN | 105788491 | A | 7/2016 |
| EP | 0944250 | A1 | 9/1999 |
| EP | 1094657 | A1 | 4/2001 |

* cited by examiner

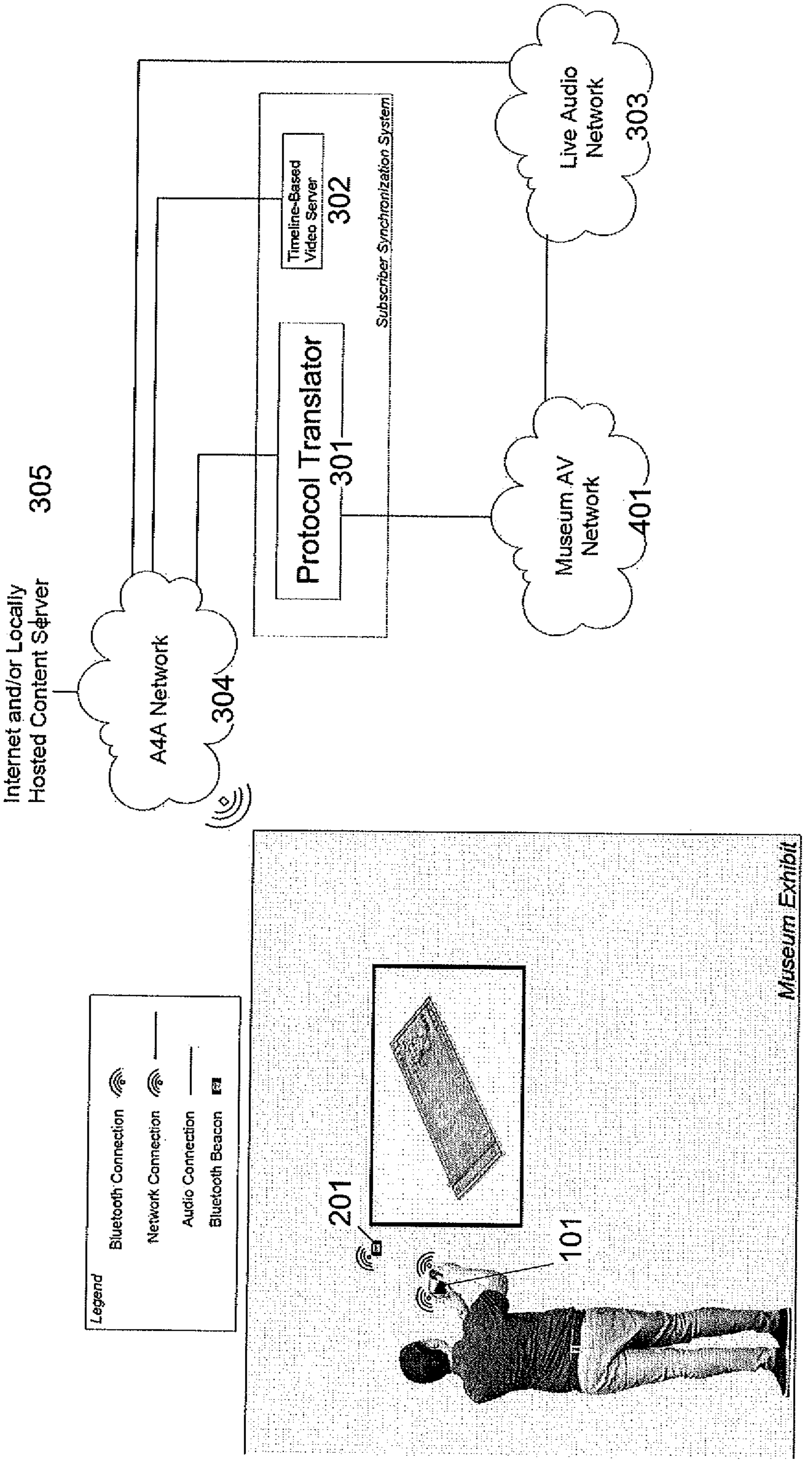
Figure 1 - Access 4 All System Diagram

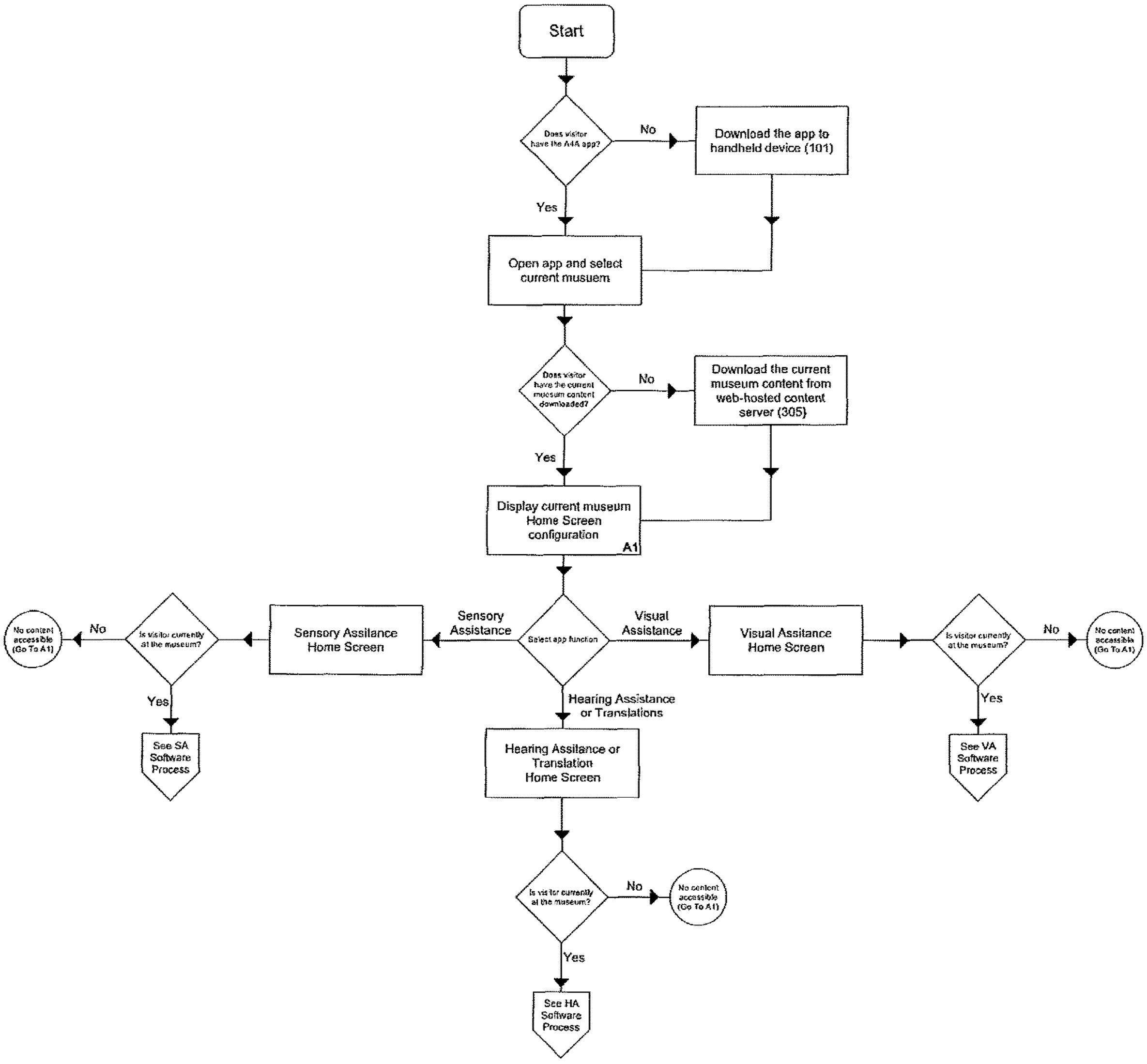
Figure 2 - Visitor GUI Interaction with App

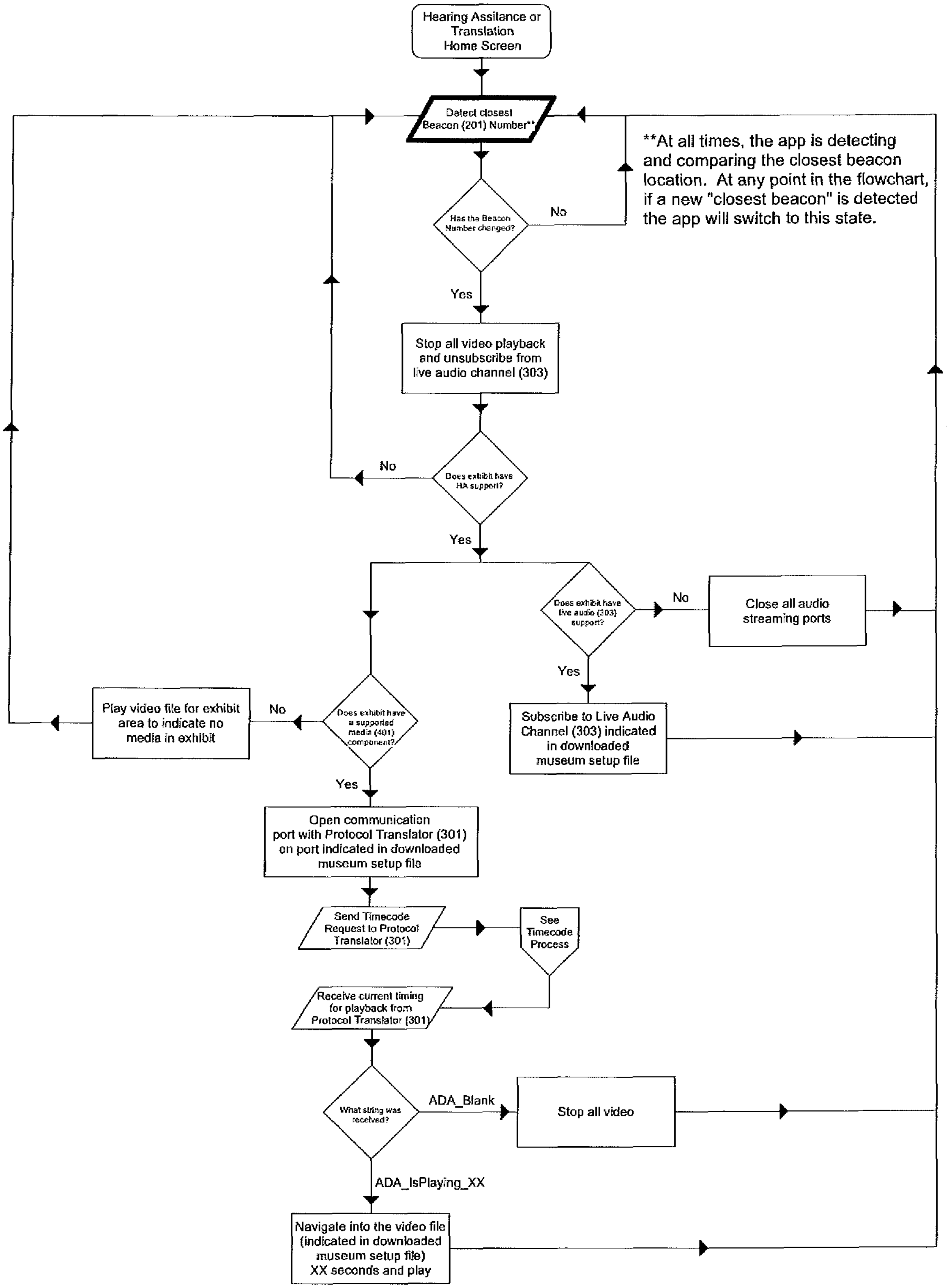
Figure 3 - App Software Flowchart for Hearing Assistance and Translations

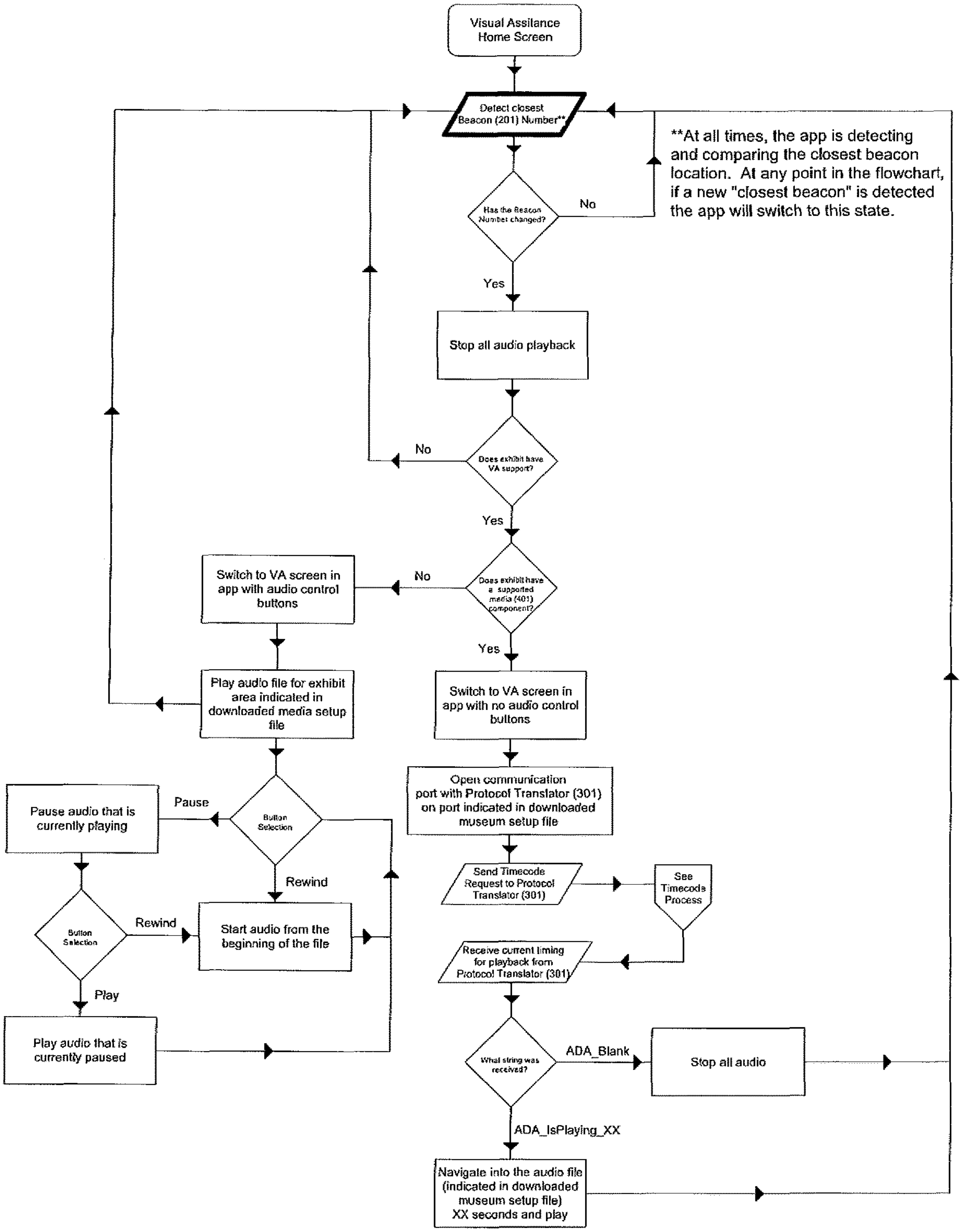
Figure 4 - App Software Flowchart for Visual Assistance

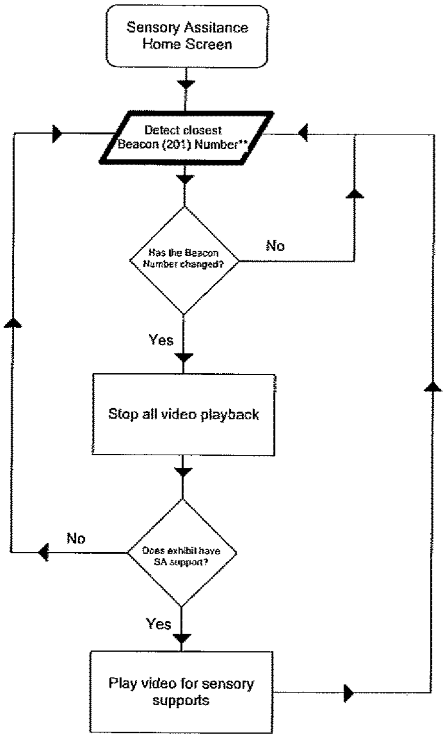
**At all times, the app is detecting and comparing the closest beacon location. At any point in the flowchart, if a new "closest beacon" is detected the app will switch to this state.
Figure 5 - App Software Flowchart for Sensory Assistance
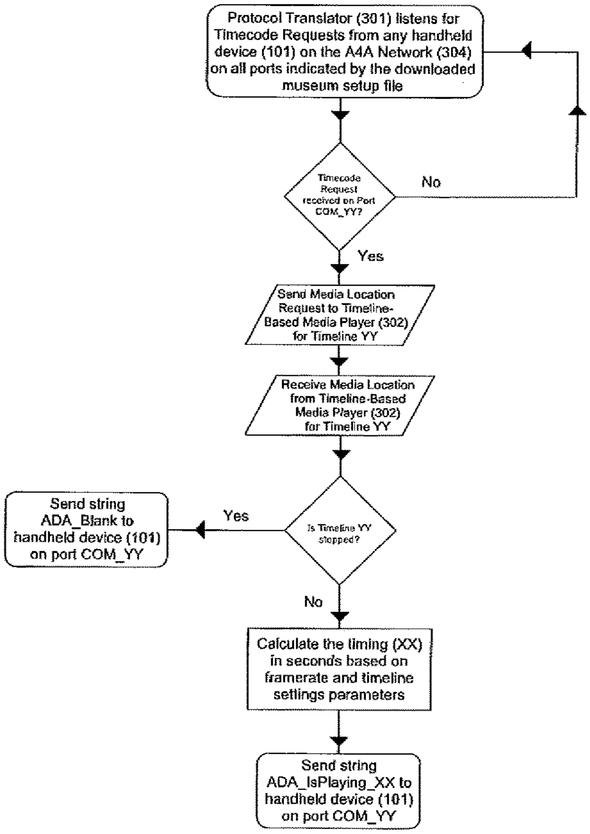
Figure 6 - Timecode Process for Protocol Translator (301)

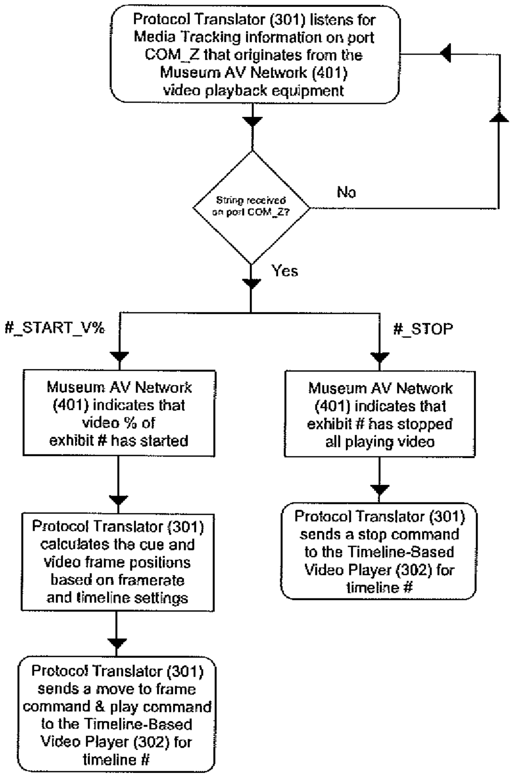
Figure 7- Museum AV Network (401) Media Tracking Process

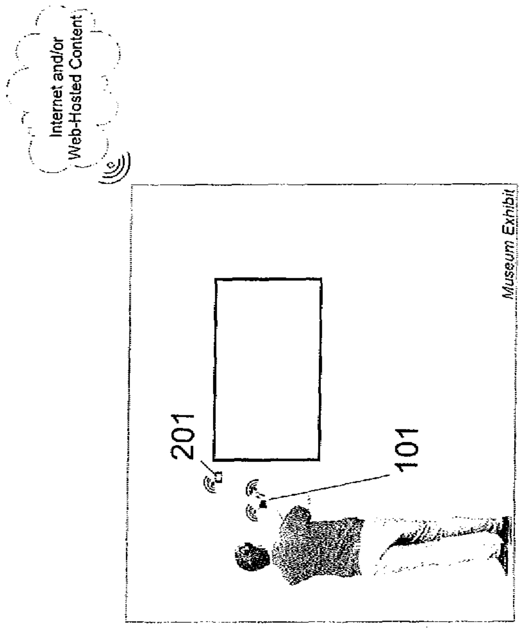
Figure 8 - Current Location-Based Systems on the Market
PRIOR ART

MUSEUM ACCESS FOR ALL SYSTEM AND METHOD

BACKGROUND OF THE INVENTION

The present invention relates to a museum access for all system and method. In any country or municipality, citizens and residents are interested in preserving history and providing means for education and entertainment. As such, over the course of civilization, museums have been devised to serve the public need in these regards. One great example is the Smithsonian Institution located in the metropolitan area of Washington, D.C. This institution operates numerous museums for access by the public covering subjects as diverse as art history, natural history, air and space, American Indian affairs, Black history, modern art, and others. The United States operates the National Archives where one may view original copies of the Constitution and Declaration of Independence as well as other valuable historic documents useful to historians and other interested persons. Similar facilities are found throughout the United States and around the world.

Where museums and other publicly accessible facilities are created for the edification of the public, operators of those facilities recognize that not every visitor has complete use of all their faculties. Some people are deaf or hard of hearing, other people are visually impaired, and still other people use wheelchairs or need assistance with mobility. A user friendly facility should take into account these disabilities and make all best efforts to "equalize" the experience for all visitors.

In museums today, inclusivity is always being discussed by the administrators with the goal of achieving equality of experience for visitors. Unfortunately, to date, no system has yet been devised which can equalize the experience of visiting a museum for all potential visitors. Some systems can account for hearing deficiencies and assist people who are deaf or hard of hearing in enjoying their visit. Others, fewer in number, can account for visual impairment and assist people who are visually impaired in enjoying their experience, and Applicant is unaware of a system that accommodates to multiple disabilities including cognitive issues such as Autism and other learning disabilities. Museum administrators are always conscious of the cost of operating a museum and systems for equalizing the experience for all visitors can be expensive and complex. Museums are often in peril of being in violation of the Americans with Disabilities Act if they do not equalize the experience for all potential visitors.

Currently, various systems are available on the market that provide synchronized captions, visual descriptors, and/or translations for live media content within museums. To Applicant's knowledge, such equipment is specialized to solely one of the assistive types and no systems or applications are currently available that encompass multiple assistive needs. Applicant is also unaware of anything on the market that includes assistance for people with sensory needs such as for people diagnosed with Autism. FIG. 8 shows a typical prior art system currently used in museums. Shown in FIG. 8 is a visitor owned smartphone device or a museum owned device designated by the reference numeral 101 but, in the latter instance, which can be rented to a visitor to a museum. The handheld device contains an APP or browser application that the visitor or museum can download via an Internet connection. Numerous Apple, Android, and other types of devices might comprise this device 101. Reference numeral 201 refers to a Bluetooth beacon device that transmits an identification number. The identification number is continuously broadcast for the handheld device 101 to detect. The APP on the handheld device determines what content is available to the visitor by selecting the closest beacon device 201 via detected Bluetooth signal strength and performing distance calculations determined by the downloaded APP. The Bluetooth beacon devices 201 are located in the exhibit spaces of the museum. Depending upon the type of application employed, the Bluetooth beacon device 201 can pull up a designated web page that describes the museum exhibit or it can play back a file that is stored on the handheld device 101 or hosted on a website. This is described in Chinese Published Application No. CN 105574564A discussed subsequently. The prior art also contemplates use of a QR Code replacing the Bluetooth beacon within the museum exhibit and the visitor can scan a QR Code with their handheld device to access the audio content or website. Visitors with visual impairment may have difficulty finding the QR Code to access the content.

One feature known in the prior art is open captioning in which captions are always displayed on screen. Program producers often do not like such a feature because they believe it distracts the user from the production. In this regard, the user might be distracted by the caption and not clearly view the content. Closed captioning is another option but still shares the disadvantages of open captioning. In this regard, program producers often supply two video files, one with captioning and one without.

Also known in the prior art are synced visual descriptors as well as live audio or translations which can use rented devices that utilize differing radio frequencies for various exhibits or theaters. Such features are limited in that handheld devices are limited to channel frequencies and might have to be either physically changed or have limitation on the use of such a device for certain exhibits or theater presentations where multiple frequencies must be available.

Additionally, infrared devices have two distinct channels, one containing live audio and the other with visual descriptor. This is limiting as well.

Other types of devices are known in the prior art including rentable devices as well as the use of Bluetooth beacons which only transmit an identification number for a handheld device to detect. A Bluetooth beacon can pull up a designated web page that describes the museum exhibit or it can play back a file that is stored on the handheld device or hosted on a website.

In the museum industry, a need has developed for a system and method of operating the system which equalizes the experience of visiting the museum for all visitors regardless of disability and which is easy to install, relatively inexpensive to obtain, utilizes the ability of most visitors to download an APP onto a smartphone and is user friendly and informative. It is with these needs in mind that the present invention was developed.

The following prior art is known to Applicant:

Chinese Published Application No. CN 105574564A filed by China Xuan Paper Co. Ltd. discloses use of a Bluetooth device to store an ID that activates content within a man-machine interaction module. It uses a background server to store all museum content. The present invention differs from the teachings of this publication in that in the present invention a web server stores all content and an associated APP provides the ability to download content specific to a museum the user is visiting. As best understood, this Chinese reference teaches storage of content on a web server and a Bluetooth device delivers the ID of the location and allows a mobile device to access content that resides on a background server. By contrast, in the present invention, the location of the ID will instead trigger specific content playback or send communication requests that enable the APP to playback synced content to the media within the beacon location exhibit.

U.S. Pat. No. 5,461,371 to Matsumoto et al. discloses an exhibit explaining system activated by infrared signals. The system includes use of handheld devices that sense visitor location and play audio that automatically starts when a visitor is in a predetermined distance from an exhibit. The user can control audio playback and content is stored within the handheld device. The present invention differs from the teachings of this patent in that the patent discloses use of infrared light or radio waves for an ID signal.

Chinese Publication No. CN 202084269U filed by the University of Shanghai for Science and Technology discloses a museum interpretation machine in which exhibits are provided ID tags, radio frequency determines the location of a visitor and selects the audio frequency to tune to for audio in that area and volume adjustment of the audio is possible. While the present invention does contemplate subscribing to a streaming audio channel over a network for live audio content, the present invention differs from the teachings of this publication in that the publication describes exhibit tags that are RFID, most of the audio content is delivered over an RF frequency instead of held on a device carried by the user, and sensor information can be passed back to the main server.

U.S. Published Application No. US 2011/0307599A1 to Saretto et al. discloses a proximity network in which there are multiple human devices and cloud computing is used to download code and content. The present invention is similar to Saretto et al. in these regards because the main web server holds all content until it is downloaded as needed by the associated APP. However, the present invention differs from the teachings of Saretto et al. in that (1) the Saretto et al. device provides an experience server location information and uses a network server to determine proximity; (2) the Saretto et al. device facilitates user interaction with the experience server to create a multi-user experience; (3) in Saretto et al., location and positioning of users are based on human device information; and (4) when interactions occur in the Saretto et al. device, the system downloads additional code as needed. The present invention does not include these features.

Chinese Publication No. CN102568357A filed by Hongfujin Precision Industry Shenzhen Co. Ltd. et al. discloses an electronic device and method for conducting an automatic exhibition guide in an exhibition hall. In the prior art device, a handheld device uses positioning information to determine the closest exhibit and auto plays the content. This is similar to the use in the present invention of Bluetooth beacon strength. However, the present invention differs from the teachings of this publication in that in the prior art device position information is based upon coordinates and compass information and exhibit locations are stored in tables and calculations are performed to determine the closest exhibit.

Chinese Publication No. CN102163397A filed by Dalian Jiaotong University discloses a self-service multimedia intelligent commentary system. In this prior art publication, it is possible that the system could be used for translations. Therein, the visitor carries an RFID card and the system "sees" the card within an exhibit, wherein the card triggers a translation to play simultaneously within the exhibit as a multimedia program. The present invention has no such operation.

U.S. Published Application No. US 2002/0143657 A1 to Yamaguchi et al. discloses an ID tag-based explanation system. The present invention differs from the teachings of this publication in that, unlike the present invention, the prior art device uses a sort of ID tag that can combine to create various codes similar to a bar code and each ID tag when sensed refers to a data table to provide an explanation. ID tags are combined to execute operations.

U.S. Published Application No. US 2006/0168300 A1 to An et al. discloses a gallery tour guide system and method for real time provision of information using stored data. The present invention differs significantly from this prior art system. In the prior art system, there is a RFID tag at each exhibit which routes to a URL/web page for information about the exhibit, and it combines exhibit information with Internet information and access to a web page hosted on a web server. Devices to be used by visitors are rentable whereas in the present invention museums will have the ability to rent out and use owned devices.

European Published Patent Application No. EP 1094657 A1 filed by British Telecommunications discloses a mobile conferencing system and method. This publication is considered to be general background information.

Chinese Published Application No. CN105788491A filed by Xian Tektong Digital Technology Co. Ltd. discloses a museum exhibition room sensing interpretation system. In contrast to the present invention, this publication discloses infrared sensors connected to a central computer via CAN BUS. Infrared sensors play content files as people move toward an exhibit.

U.S. Pat. No. 8,090,459 to Hsu discloses a guiding-tour system and apparatus. The present invention differs from the teachings of Hsu in that, unlike the present invention, Hsu discloses a playback device associated with an exhibit piece. The Hsu device is located at the exhibit itself and retains content on an SD card locally. A handheld device scans and sees the playback device and audio is wirelessly transmitted from a playback device.

Published European Patent Application No. EP 0944250 A1 to Ito et al. discloses systems for explaining exhibits. The disclosed systems include use of a physically wearable device that displays video and receives audio over selected frequencies. The exhibit has a transmitter to send content over the set frequencies and a headset worn by the user provides content to the user.

SUMMARY OF THE INVENTION

The present invention relates to museum access for all system and method. The present invention includes the following interrelated objects, aspects and features:

(1) In a first aspect, the present invention includes an APP that a user may download onto their smartphone from an APP store such as the Apple APP store or the Google Play store.

(2) A variety of museums can subscribe to the APP in a manner well understood by those skilled in the art. As the user enters a particular museum and opens the APP, the APP asks the user to choose one of the subscribed museums. When the subscribed museum is chosen, custom content concerning that museum is downloaded onto their smartphone including but is not limited to audio files, video files, image files, and the museum-specific setup file.

(3) As the user walks around the museum, the user has opened one of three APP assistance areas in the software directed to hearing assistance, visual assistance, or sensory assistance aspects. As the visitor encounters a beacon, the APP "knows" where the user is located within the museum.

(4) If the user arrives at an exhibit and the exhibit has no media or audio visual content, there is no interaction between the user's smartphone and the Subscriber Synchronization System, and the APP will determine, using the museum-specific setup file, which audio or video file to playback that is associated with the exhibit location and the selected assistance area (hearing, visual, or sensory). However, if there is such content, the APP sends a location request to the Subscriber Synchronization System on a communication port specified by the beacon location ID, then receives timing information back and plays the associated file in sync to the media within the exhibit.

(5) For the inventive system and method to operate, a number of pieces of equipment must be provided which interact together to operate the present invention. Those components include a proximity beacon that facilitates determining the location of the user's smartphone with the APP downloaded therein, and a Subscriber Synchronization System which is installed at the location of the museum and connected to the museum's local audio video system network. A live audio feed option is also provided to stream audio over the network with low latency.

(6) A Subscriber Synchronization System is employed that will be described in greater detail hereinafter which embodies a Protocol Translator, that handles all communication protocols including communication and socket control of connected devices and monitoring of timelines, and a Timeline-Based Video Player, that tracks the media components within the local Museum Audio/Video System.

(7) A Protocol Translator is provided to receive location information and requests from the smartphone or other handheld device, receive playback status of the content players within the local Museum Audio/Video System, and communicate with and control the Timeline-Based Video Player to mimic the playback state of the Museum Audio/Video System exhibits so that current timing status can be polled as the APP requests are made. The Protocol Translator also initializes and sets up timelines on the Timeline-Based Video Player through an initial xml setup document. Similarly, a Live Audio Aetwork is provided at exhibits where audio streams can be connected to within the APP.

(8) The inventive system includes an Internet connection and a hosted content server allowing the visitor to download the APP as well as museum specific content to their handheld device if they did not do so prior to entering a particular museum.

(9) A preferred method of operating the present invention involves downloading an APP onto a smartphone, any handheld device on which the software can be downloaded and suitably be used in accordance with the teachings of the present invention. A portable module having the ability to receive and transmit information and with memory to allow downloading of APP information as well as museum information can be employed in accordance with the teachings of the present invention.

(10) Included in the present invention is the ability to translate content into a foreign language or from a foreign language. Thus, for example, an American citizen who speaks English wishes to travel to a foreign country where English is not the main language, that person can visit a museum in which content is provided in the foreign language and the APP can translate the content into English or any other language which is suitable for the user.

As such, it is a first object of the present invention to provide museum access for all system and method.

It is a further object of the present invention to provide such a system and method in which an APP may be downloaded onto a smartphone or other handheld multi media device.

It is a still further object of the present invention to provide such a system and method which includes components installed in a variety of museums and an APP compatible with those components to allow sensing of the presence of the smartphone or other device in proximity to a museum exhibit and the ability to start the playing of a program for visitors in need of visual, audio, and/or sensory assistance.

It is a still further object of the present invention to provide such a system and method in which members of the public regardless of disability may visit any subscribed museum and enjoy visiting the museum and its various exhibits while being educated with programming material which is compatible with the device they are holding to facilitate playing of program material for their educational and entertainment purposes.

These and other objects, aspects and features of the present invention will be better understood from the following detailed description of the preferred embodiments when read in conjunction with the appended drawing figures.

BRIEF DESCRIPTION OF THE DRAWINGS

FIG. 1 shows a schematic representation of the inventive system.

FIG. 2 shows a first portion of a flowchart showing the operation of the inventive system.

FIG. 3 shows a continuation of the flowchart shown in FIG. 2.

FIG. 4 shows a flowchart of the visual assistance operation of the present invention.

FIG. 5 shows a flowchart of the sensory assistance portion of the inventive system.

FIG. 6 shows a flowchart for the inventive protocol translator.

FIG. 7 shows a flowchart for the museum audio visual network media tracking process.

FIG. 8 shows a representation of a prior art system.

SPECIFIC DESCRIPTION OF THE PREFERRED EMBODIMENTS

FIG. 1 shows a schematic representation of an example of the present invention.

In museums today, inclusivity is always being discussed. Unfortunately, there is nothing on the market that addresses all disabilities. Most often, products are used that cover hearing assistance, and even fewer that cover visual assistance. Applicant is unaware of any such system devised to address sensory processing difficulties such as Autism. For most museums, cost is a big factor, and many are not able to invest in multiple high-cost systems. Instead, they decide to go without the assistive supports and risk violating the Americans with Disabilities Act.

The present invention is an all-encompassing solution that provides museums with the tools and content necessary to make sure those visitors who need support have access to it. The unique media tracking element of the present invention allows for it to be added to a pre-existing or new multimedia system. While current audio tour systems typically need an input from the visitor to select which exhibit they are currently in, the location-based system of the present invention allows for visitors to roam a museum and gain access to the assistive content needed based on the closest exhibit.

Innovations that the present invention provides include:

a) Hearing, visual, sensory, and translation capability all supported under a single application and system;

b) Sensory support for each exhibit to help those individuals with a sensory sensitivity or diagnosis like Autism;

c) Visitors can easily use their own device, as renting out devices is typically a concern in the post-COVID world;

d) Location-based content—content is only accessible when in the museum; and e) Media tracking capabilities for pre-existing museum audio/video systems or new installations. This capability makes syncing between handheld devices and live video content possible.

With reference to FIG. 1, the system includes the following components:

A visitor-owned smartphone/device or museum-owned device 101 that can be rented to the visitor. This handheld device 101 contains the "A4A" (Access For All) APP that the visitor or museum can download via an Internet connection. When outside of the museum, the visitor can select which museum they are planning to visit and download the content from the web-hosted content server 305. Museum-specific content cannot be accessed outside of the museum. This device utilizes both Bluetooth and Wireless technologies. As is well known, a smartphone has a built-in computer with a memory, a display, ability to communicate audio and visual programming and a wireless transmitter and receiver. The same is true of modules rentable from museums.

Examples of devices usable with the system include Apple iPhone, iPod Touch, iPad, or iPad Mini; Google Android Device, a Bluetooth beacon 201 (equipment installed within the museum for use with "A4A" APP). The Bluetooth beacon device 201 only transmits a programmed identification number. It continuously broadcasts its device number via Bluetooth for the handheld device 101 to detect. The APP on the handheld device 101 determines what content is available to the visitor by selecting the closest beacon device 201 via Bluetooth signal strength and distance calculations determined by the APP by incorporating the Bluetooth beacon's manufacturers SDK into the APP. The Bluetooth Beacon devices 201 are located in the exhibit spaces of the museum. One example of a proximity beacon device usable with the present invention is the Estimote Proximity Beacon device.

The Protocol Translator device 301 (equipment installed within the museum for use with "A4A" APP) is the communications manager between all aspects of the "A4A" APP and system. It receives location information and requests from the handheld device 101, initializes and sets up the timelines for the Timeline-Base Video Player 302, receives playback communication from each of the exhibit multimedia players in the Museum AV (audio-visual) Network 401, and translates the playback status of the individual multimedia players to the Timeline-Based Video Player 302 in order to consistently track the exhibit media state, request current playback state and timecode from the Timeline-Based Video Player 302, and send the current timecode location and status to the handheld device 101. The AMX NX Series Controller is an example of a protocol translator usable in the present invention. The museum AV network 401 comprises a facility system including video and audio playback equipment.

A Timeline-Based Video Player 302 (equipment installed within the museum for use with "A4A" APP) is used to track the playback of the various multimedia elements of the Museum AV Network 401. This feature allows for the "A4A" APP and installed system to be backwards compatible to any Museum AV System 401. The setup of the Timeline-Based Video Player 302 is completed by uploading an xml setup document to the Protocol Translator 301 that contains media timeline information of the various multimedia exhibits within the existing Museum AV Network 401. The Protocol Translator 301 then translates the xml data into the network protocol that the Timeline-Based Video Player 302 understands. This creates an individual timeline for each of the multimedia exhibits within the Museum AV Network 401. The display of this device shows the playback status of each timeline that tracks a multimedia element of the Museum AV Network 401. The $7^{th}$ Sense Delta Pico Server (general computer with Delta Server software) is an example of a timeline-based video player usable in the present invention.

The Live Audio Network 303 (equipment installed within the museum for use with "A4A" APP) allows for the handheld device 101 to receive lip-synced audio over the "A4A" Network 304. There is one live audio device for each exhibit media player in the Museum AV Network 401. This live audio device connects to the audio output of the exhibit media player, then streams that audio over the "A4A" Network 304 via an RTP protocol. The handheld device 101 then connects to the associated RTP stream of the Live Audio Network 303, as indicated by the downloaded museum-specific setup file, and delivers lip-synced audio to the visitor through headphones or other connected listening devices. A Barix AudioPoint 3.0 can be employed as the Live Audio Network 303.

The "A4A" Network 304 (equipment installed within the museum for use with "A4A" APP) is an interconnectivity of the Protocol Translator 301, Timeline-Based Video Server 302, and the Live Audio Network 303 through a CAT6 or better cable network that includes a router, switches, and wireless access points as understood by those skilled in the art. The handheld device 101 connects to the "A4A" network 304 through a wireless network connection. The "A4A" Network 304 is connected to the Internet which is where the web-based content server is hosted 305. This allows the visitor to download the "A4A" APP and museum-specific content to their handheld device 101 if they did not do so prior to entering the museum.

The Museum AV Network 401 is the current audio/video system that is installed within museums. This network can be installed at the same time as the "A4A" system or can be pre-existing. A typical Museum AV System consists of video and audio playback equipment, projectors, monitors, touchscreens, computers, audio DSP system, amplifiers, and speakers, a wireless transmitter and receiver along with proximity sensors adjacent each display, to name a few. The purpose of the "A4A" APP and installed system is to provide local content support on the visitor's handheld device 101 that syncs to the multimedia content within the Museum AV Network 401.

With reference now to the flowchart of FIG. 2, the visitor interacts with the "A4A" system through a downloaded APP on their personal or rented handheld device 101. The APP has stored therein information concerning each museum or other facility that has the inventive system installed therein. If the APP detects that the visitor is not at a museum location with the "A4A" Network and System, no content will be available on the APP. Outside of a museum location, a visitor can select the museum they will be visiting to pre-download the content but will not be able to access the content in any of the Hearing Assistance or Translations, Visual Assistance or Sensory Assistance Home Screens. When the APP detects the visitor at a museum location, the downloaded content is available as the handheld device 101 detects the closest Bluetooth Beacon 201.

As shown in the flowchart of FIG. 3, in the Hearing Assistance or Translations section of the APP on the handheld device 101, the APP is continuously detecting the closest Bluetooth Beacon 201. At any point in the flowchart, if a closer Bluetooth Beacon 201 is found, the APP will revert to the Detection State (bolded at the top of the flowchart). When a new Bluetooth Beacon 201 is detected, the APP uses the downloaded museum-specific setup file to determine if this exhibit area has any content for Hearing Assistance. Hearing Assistance support comes in two types: live audio streaming from the Live Audio Network 303, and captions synchronized to the exhibit video player within the Museum AV Network 401. Volume level of the content on the handheld device 101 is controlled by the visitor.

If the museum-specific setup file indicates that there is live audio for this exhibit area, the APP connects to the Live Audio Streaming Channel 303 for that Bluetooth Beacon 201 number. If the museum setup file indicates that the Museum AV Network 401 has a media component, the APP opens a communication port with the Protocol Translator 301 and sends a Timeline Request. The Protocol Translator starts the Timecode Process (see FIG. 6) and sends the received current timing information back to the APP on the handheld device 101. The APP then processes the information and either stops all video content or plays the video file starting at the location specified by the timing information.

With reference to the flowchart of FIG. 4, in the Visual Assistance section of the APP on the handheld device 101, the APP is continuously detecting the closest Bluetooth Beacon 201. At any point in the flowchart, if a closer Bluetooth Beacon 201 is found, the APP will revert to the Detection State (bolded at the top of the flowchart). When a new Bluetooth Beacon 201 is detected, the APP uses the downloaded museum-specific setup file to determine if this exhibit area has any content for Visual Assistance. Visual Assistance support comes in two types: descriptive audio of the surrounding exhibit area, and descriptive audio synchronized to the exhibit video player within the Museum AV Network 401. Volume level of the content on the handheld device 101 is controlled by the visitor.

If the museum setup file indicates that the Museum AV Network 401 has a media component, the APP opens a communication port with the Protocol Translator 301 and sends a Timeline Request. The Protocol Translator starts the Timecode Process (see FIG. 6) and sends the received current timing information back to the APP on the handheld device 101. The APP then processes the information and either stops all audio content or plays the audio file starting at the location specified by the timing information. If the museum setup file indicates that the Museum AV Network 401 does not have a media component, the APP plays a descriptive audio file for the exhibit and gives the visitor playback control of the audio.

With reference to the flowchart of FIG. 5, in the Sensory Assistance section of the APP on the handheld device 101, the APP is continuously detecting the closest Bluetooth Beacon 201. At any point in the flowchart, if a closer Bluetooth Beacon 201 is found, the APP will revert to the Detection State (bolded at the top of the flowchart). When a new Bluetooth Beacon 201 is detected, the APP uses the downloaded museum-specific setup file to determine if this exhibit area has any content for Sensory Assistance. Sensory Assistance consists of video behavioral supports that play on the handheld device 101 for each exhibit. The visitor has volume level and playback control of the content on the handheld device 101.

The Timecode Process used by the Protocol Translator 301 is unique in this system (see the FIG. 6 flowchart). The Protocol Translator 301 is continually listening on all communication ports for Timecode Requests from handheld devices 101 that are connected to the "A4A" Network 304. Each unique communication port number correlates to a Media Timeline running on the Timeline-Based Video Player 302. When a Timecode Request is received, the Protocol Translator 301 sends a Media Location Request to the Timeline-Based Video Player 302 for the Media Timeline that corresponds to the current exhibit location as determined by the closest Bluetooth Beacon 201. The Protocol Translator 301 receives a string back from the Timeline-Based Video Player 302 and determines whether the current exhibit media is stopped or playing. The Protocol Translator 301 then completes the comparisons and/or calculations between the received timing data and the initial exhibit media timing information taken from the xml setup documented uploaded to the Protocol Translator 301, and sends the correct exhibit media status information to the handheld device 101. This status allows the handheld device 101 to sync to the exhibit media player that resides on the Museum AV Network 401, allowing for Hearing Assistance captioning, Translations, or Visual Assistance descriptive audio to sync with the onscreen media content.

The Media Tracking Process of the media content within the Museum AV Network 401 (see FIG. 7 flowchart) creates a unique system that allows for the "A4A" APP to be retrofitted to existing Museum AV Systems or used in new installations. While the Protocol Translator 301 is listening for Timeline Requests from any handheld device 101 on the "A4A" Network 304, it is also listening for Media Tracking information from video playback equipment on the Museum AV Network 401. Each exhibit is assigned a number that corresponds to the Media Timeline used for tracking playback content on the Timeline-Based Video Player 302 and is stored in the downloaded museum-specific setup file on the handheld devices 101 which is used to determine the communication port with the Protocol Translator 301.

When a video player on the Museum AV Network 401 begins the playback of a file, the player sends a string to the Protocol Translator 301 that indicates the exhibit number and which video has started playing. Once this is received by the Protocol Translator 301, it calculates the cue and video frame positions based on the frame rate and timeline settings as indicated in the xml setup document. The Protocol Translator 301 then sends two commands to the Timeline-Based Video Player 302: a move to frame command and play command for the timeline that corresponds to the exhibit number.

When a video player on the Museum AV Network 401 stops the playback of a file, the player sends a string to the Protocol Translator 301 that indicates the exhibit number, and that the player has stopped all playing content. Once this is received by the Protocol Translator 301, it sends a stop command to the Timeline-Based Video Player 302 for the timeline that corresponds to the exhibit number.

This creates an external system that allows for tracking of live media content within a museum and can be standardized across video media player manufacturers. The benefit to this system makes the museum more accessible for others in a way that enhances the experience. If a visitor enters an exhibit with live media content, the Media Tracking process allows for better media visual descriptions, captioning, and translation options that are automatically synchronized on their personal handheld device 101.

In the operation of the present invention, the museum visitor downloads the "A4A" APP onto their device from the Apple APP Store or the Google Play Store or other APP source. As the visitor enters the museum and opens the APP, it will ask the user to choose a museum from a list of museum subscribers. Choosing a museum subscriber downloads custom content to their device. These files include xmls files that contain local system information for the Subscriber Synchronization System (i.e., network communication ports and IP information, beacon information, GUI layout information, and general APP configuration information), and audio and video files that are custom created content that include captions, video descriptor files, and social stories.

The visitor then walks around the museum with one of the three available APP assistance areas open—Hearing Assistance, Visual Assistance or Sensory Assistance. As the visitor encounters a beacon, the APP knows where the visitor is in the museum space.

1. If the beacon configuration has no media or audio/video content—no interaction with Subscriber Synchronization System.
   a. Hearing Assistance—plays a video for that area indicating there are no captions or audio in this area.
   b. Visual Assistance—plays the visual descriptor audio file for the area.
   c. Sensory Assistance—plays the social story video for the area.
2. If the beacon configuration has media or audio/video content (i.e., a video playing on a monitor with audio)—there is communication with Subscriber Synchronization System.
   a. Hearing Assistance—the xml setup document data indicates that this beacon area needs more information about the local media and/or needs to connect to a live audio feed. As required, the APP connects to the live audio RTP stream and sends a LOCATION message to the Protocol Translator to determine the current timecode of the area's video through communication with the Timeline-Based Video Player. The Protocol Translator sends back a message indicating the current timecode and plays the caption video file for the area starting from the specified timecode, so that the caption file on the device is playing in sync with the video on-screen.
   b. Visual Assistance—the xml setup document data indicates that this beacon area needs more information about the local media. The APP then sends a LOCATION message to the Protocol Translator to determine the current timecode of the area's video through communication with the Timeline-Based Video Player. The Protocol Translator sends back a message indicating the current timecode and plays the visual descriptor audio file for the area from the specified timecode, so that the visual descriptor file on the device is playing in sync with the video on-screen.
   c. Sensory Assistance—plays the social story video for the area.

Equipment utilized in the "A4A" system includes the following as examples:

1. Beacon—Estimote proximity beacon to determine location of device through iBeacon and Eddystone protocols.
2. Museum Audio/Video System—this is the current audio/video system of the museum (equipment will be different at every museum and can include projectors, monitors, audio players, video players, computers, etc.). The "A4A" APP and the Subscriber Synchronization System can be easily integrated into new and currently installed audio/video systems.
3. Live Audio Network—Barix AudioPoint 3.0 system, which streams audio over the network via an RTP protocol and has very low latency (so that the audio lip-syncs to videos). The APP uses their SDK to connect and disconnect from streams of audio.
4. Subscriber Synchronization System—currently using an AMX NX-3200 as the Protocol Translator in combination with a $7^{th}$ Sense Design Delta Pico Server as the Timeline-Based Video Player. A Medialon Control Server may also be suitable as a Protocol Translator.
   a. AMX NX-3200/Protocol Translator—custom coding that handles all communication protocols
   including communication and socket control of connected handheld devices and video players located on the Museum Audio/Video Network, and
   monitoring timelines on Delta Pico (Timeline-Based Video Player).
   b. $7^{th}$ Sense Delta Pico/Timeline-Based Video Player—includes custom timeline programming that tracks the Museum Audio/Video System media.
      i. c. Communication between Protocol Translator and the Timeline-Based Video PlayerSetup—a custom created xml setup document contains information about all of the media content of the Museum Audio/Video System (video file names, number of files, length of files) is ingested by the Protocol Translator during configuration and sent via network communication to the Timeline-Based Video Player. This setup communication creates a custom, dedicated timeline for each media exhibit within the Museum Audio/Video System and mimics the playback of that exhibit.
      ii. Museum Audio/Video System Tracking—as the Museum Audio/Video System is running, the playback devices send communication to the Protocol Translator when the video starts and stops. This communication controls the dedicated timeline for that video on the Timeline-Based Video Player, so that it can be used to track the video player.
      iii. Visitor Usage—when the Protocol Translator receives the LOCATION command from a handheld device, the Protocol Translator then polls the Timeline-Based Video Player to determine what the current timecode of the video for that area is.

As such, an invention has been disclosed in terms of preferred embodiments thereof which fulfill each and every one of the objects of the invention as set forth hereinabove, and provides a new and useful museum access for all system and method of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. A method of facilitating informed access by visitors to a facility with a plurality of displays, including the steps of:

a) providing a visitor with a handheld module owned by said facility and rented to said visitor having a computer with memory, a display, ability to communicate audio and visual programming, and a wireless transmitter and receiver;

b) downloading an APP into said memory, said APP facilitating said module being able to communicate programming designed for people who are deaf or hard of hearing, people who are visually impaired, people with sensory sensitivities, sensory processing difficulties comprising autism and people who use a primary language different from a primary language of said facility;

c) each facility having a facility system including video and audio playback equipment comprising a plurality of exhibit multimedia players, a computer with a memory which includes a subscriber synchronization system comprising a protocol translator and a timeline-based media player, and a wireless transmitter and receiver;

d) facilitating changing system settings of said facility and facilitating adding and/or changing supportive media content;

e) said APP storing on each handheld module a list of facilities in which a facility system is installed;

f) when a visitor is inside or outside a chosen facility location and said handheld module including custom content comprising any one or more of captions, video descriptor files and social stories is connected to a worldwide wireless communication network, said visitor selecting said chosen facility location, whereupon informational content regarding displays in said facility can be downloaded onto said handheld module, however said informational content may not be accessed unless said visitor is near, adjacent or within said chosen facility location;

g) said visitor choosing on said APP whether to access supportive multimedia programming for people who are deaf or hard of hearing, people who are visually impaired, people with sensory sensitivities, sensory processing difficulties including autism and/or people who use a primary language differing from said primary language of said chosen facility location, said APP playing a social story video for an area, for a visitor with sensory processing difficulties;

h) sensing by a proximity sensor adjacent each particular display for proximity of a visitor's handheld module and, responsive to sensing such proximity, causing informational content concerning a closest said display to be communicated on said handheld module for said visitor; and i) listening by said protocol translator for time code requests from handheld modules, and when a time code requests are received by said protocol translator, said protocol translator determines exhibit locations of said handheld modules based upon communication ports on which time code requests have been received and sends a timeline requests to the timeline-based media player within said facility system to sync supportive multimedia programming for an adjacent exhibit on a-said handheld modules to cause said media prog-ramming to play on said handheld modules, said protocol translator acting as a communications manager for said facility system; and j) said protocol translator receiving time code requests from at least one handheld module and responsive thereto, said facility system setting up timelines for said timeline-based media player and, further, said facility system receiving playback communication from said facility audio and video playback equipment, said timeline-based media player further translating playback status of each exhibit multimedia player, said timeline-based media player tracking operation of said exhibit multimedia players.

2. The method of claim 1, wherein said facility is a museum.

3. The method of claim 2, wherein said handheld module comprises a smartphone.

4. The method of claim 1, wherein said handheld module comprises a smartphone.

5. The method of claim 4, wherein said multimedia programming can be translated in any one of a plurality of languages.

6. The method of claim 1, wherein each said proximity sensor includes a beacon.

7. The method of claim 1, wherein said protocol translator receives playback status of said playback equipment.

8. The method of claim 1, wherein said multimedia programming can be translated in any one of a plurality of languages.

9. A method of facilitating informed access by visitors to a museum with a plurality of displays, including the steps of:

a) providing a visitor with a handheld module owned by said museum and rented to said visitor having a computer with memory, a display, ability to communicate audio and visual programming, and a wireless transmitter and receiver;

b) downloading an APP into said memory, said APP facilitating said module being able to communicate programming designed for people who are deaf or hard of hearing, people who are visually impaired, people with sensory sensitivities, sensory processing difficulties comprising autism and people who use a primary language different from a primary language of said facility;

c) each museum having a facility system including video and audio playback equipment comprising a plurality of exhibit multimedia players, a computer with a memory which includes a subscriber synchronization system comprising a protocol translator and a timeline-based media player, and a wireless transmitter and receiver;

d) facilitating changing system settings of said facility and facilitating adding and/or changing supportive media content;

e) said APP storing on each handheld module a list of museums in which a facility system is installed;

f) when a visitor is inside or outside a chosen museum location and said handheld module including custom content comprising any one or more of captions, video descriptor files and social stories is connected to a worldwide wireless communication network, said visitor selecting said chosen museum location, whereupon informational content regarding displays in said museum can be downloaded onto said handheld module;

g) said visitor choosing on said APP whether to access supportive multimedia programming for people who are deaf or hard of hearing, people who are visually impaired, people with sensory sensitivities, sensory processing difficulties including autism and/or people who use a primary language differing from said primary language of said chosen facility location, said APP playing a social story video for an area, for a visitor with sensory processing difficulties;

h) sensing by a proximity sensor adjacent each particular display for proximity of a visitor's handheld module and, responsive to sensing such proximity, causing informational content concerning a said closest display to be communicated on, said handheld module for said visitor; and i) listening by said protocol translator for time code requests from handheld modules, and when a time code requests are received by said protocol translator, said protocol translator determines exhibit locations of said handheld modules based upon communication ports on which time code requests have been received and sends a timeline requests to the timeline-based media player within said facility system to sync supportive multimedia programming for an adjacent exhibit on said handheld modules to cause said multimedia programming to play on said handheld modules, said protocol translator acting as a communications manager for said facility system; and j) said protocol translator receiving time code requests from at least one handheld module and responsive thereto, said facility system setting up timelines for said timeline-based media player and, further, said facility system receiving playback communication from said facility audio and video playback equipment, said timeline-based media player further translating playback status of each exhibit multimedia player, said timeline-based media player tracking operation of said exhibit multimedia players.

10. The method of claim 9, wherein said handheld module comprises a smartphone.

11. The method of claim 9, wherein each said proximity sensor includes a beacon.

12. The method of claim 9, wherein said protocol translator receives playback status of said playback equipment.

13. The method of claim 9, wherein said multimedia programming can be broadcast in any one of a plurality of languages.

* * * * *